United States Patent
Liu et al.

(10) Patent No.: US 10,242,171 B2
(45) Date of Patent: Mar. 26, 2019

(54) VERIFYING A USER IDENTITY

(71) Applicant: Lenovo (Beijing) Limited, Beijing (CN)

(72) Inventors: Xuguo Liu, Beijing (CN); Weixian Guo, Beijing (CN); Feng Gao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 186 days.

(21) Appl. No.: 15/083,605

(22) Filed: Mar. 29, 2016

(65) Prior Publication Data

US 2017/0193210 A1    Jul. 6, 2017

(30) Foreign Application Priority Data

Dec. 30, 2015 (CN) .......................... 2015 1 1021161

(51) Int. Cl.
*G06F 7/04* (2006.01)
*G06F 21/32* (2013.01)

(52) U.S. Cl.
CPC .................... *G06F 21/32* (2013.01)

(58) Field of Classification Search
CPC ..................................... G06F 21/32
USPC ........................................... 726/28
See application file for complete search history.

(56) References Cited

U.S. PATENT DOCUMENTS

| 2003/0068072 A1* | 4/2003 | Hamid | G06K 9/0002 382/124 |
| 2013/0011023 A1* | 1/2013 | Baughman | G06F 21/32 382/117 |
| 2013/0207779 A1* | 8/2013 | Uno | G06F 21/32 340/5.82 |
| 2016/0171300 A1* | 6/2016 | Takemoto | G06K 9/00617 382/117 |
| 2017/0091434 A1* | 3/2017 | Proulx | G06F 21/32 |

FOREIGN PATENT DOCUMENTS

| CN | 102473215 A | 5/2012 |
| CN | 103942334 A | 7/2014 |
| CN | 104504408 A | 4/2015 |
| EP | 2688009 A1 | 1/2014 |

* cited by examiner

*Primary Examiner* — Mohammad W Reza
(74) *Attorney, Agent, or Firm* — Kunzler, PC (57) ABSTRACT

The present embodiments provide a biometric authentication method and electronic device. A proper authentication template can be selected during the acquisition of biometric information based on the environment information thereof to authenticate the acquired biometric information, so as to enhance the effectiveness of authentication processing. The biometric authentication method comprises the steps of: acquiring biometric information of a body part in an acquisition area of a biometric acquisition module; acquiring environment information at the acquisition area of the biometric acquisition module; determining an authentication template corresponding to the environment information based on the environment information; and authenticating the biometric information based on the authentication template corresponding to the environment information.

20 Claims, 2 Drawing Sheets

VERIFYING A USER IDENTITY

The subject matter disclosed herein relates to a biometric authentication method and an electronic device.

BACKGROUND

Biometric information, acquired by electronic devices such as a mobile phone or a personal computer (PC), can be authenticated by using the stored authentication template. In the case that the acquired biometric information is authenticated successfully, specific access permissions can be granted, and illegal use of the electronic devices can thus be prevented.

When biometric authentication such as fingerprint authentication or face authentication is carried out, mismatch between the authentication template and biometric information may result from variations in environment information during the acquisition of biometric information. When huge variations exist between the environment information during the generation of authentication template and that during the acquisition of biometric information, successful authentication can be realized only by repeatedly acquiring and authenticating the biometric information, which prolongs time required for authentication, thus creating inconvenience for legitimate users and negatively impacting user experience.

An example is when fingerprint information is acquired in a wet environment and is authenticated by a fingerprint authentication template generated in a dry environment. Since the fingerprint information does not match the environment information of the fingerprint authentication template, the same fingerprint (the acquired fingerprint is the same as that which was recorded when the fingerprint authentication template was generated) cannot be authenticated successfully, which requires the legitimate users to repeat the acquisition and authentication processes, resulting in a longer waiting time for successful authentication.

SUMMARY

In light of the above problems, the embodiments aim to provide a biometric authentication method and an electronic device. A proper authentication template can be selected during the acquisition of biometric information based on the environment information thereof to authenticate the acquired biometric information, so as to enhance the effectiveness of authentication processing.

According to one aspect, the embodiments provides a biometric authentication method. The biometric authentication method comprises the steps of: acquiring biometric information of a body part in an acquisition area of a biometric acquisition module; acquiring environment information at the acquisition area of the biometric acquisition module; determining an authentication template corresponding to the environment information based on the environment information; and authenticating the biometric information based on the authentication template corresponding to the environment information.

According to another aspect, the embodiments provides an electronic device. The electronic device comprises: a biometric acquisition module, configured to obtain biometric information of a body part in an acquisition area; a memory module, configured to store an authentication template for authenticating the biometric information; and a processing module, configured to obtain environment information at the acquisition area of the biometric acquisition module, to determine an authentication template corresponding to the environment information based on the environment information, and to authenticate the biometric information based on the authentication template corresponding to the environment information.

According to the biometric authentication method and electronic device of the present embodiments, a proper authentication template can be selected by obtaining the environment information at the acquisition area of the biometric acquisition module, and determining the authentication template corresponding to the environment information based on the environment information. As a result, the effectiveness for authentication of the acquired biometric information with the authentication module can be improved and the frequency and duration of the authentication process can be reduced, thus improving the experience of legitimate users.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

The embodiments of the embodiments will be presented below with reference to drawings. Description on the following reference drawings are provided to facilitate better understanding of the illustrative embodiments of the embodiments as specified by the claims and equivalents thereof. It comprises various specific details that shall be considered for illustrative purposes only. For this reason, a person skilled in the art should recognize that various alterations and modifications can be made to the embodiments described herein, without departing from the scope and spirit of the embodiments. Moreover, in order to make the description clearer and concise, a detailed description on well-known functions and structures in the art is omitted herein.

Figure 1:
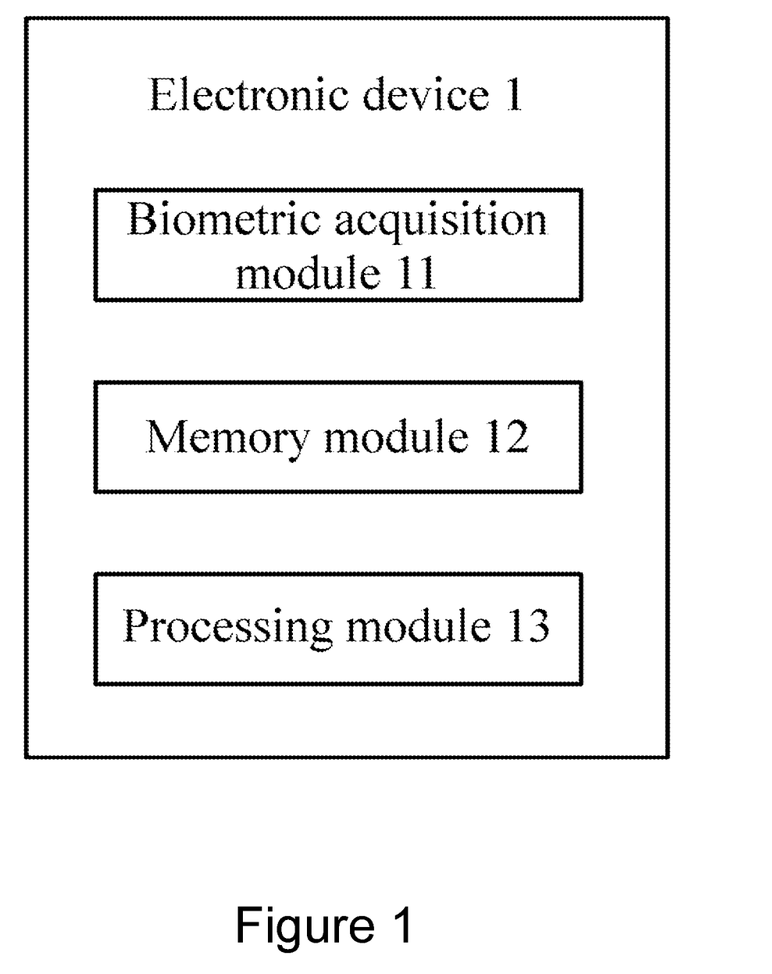
FIG. 1 illustrates a functional block diagram showing an electronic device as provided in an embodiment.

Firstly, the electronic device as provided in an embodiment of the embodiments will be presented below by referring to FIG. 1. FIG. 1 illustrates a functional block diagram showing an electronic device 1 as provided in an embodiment of the embodiments.

As shown in FIG. 1, the electronic device 1 comprises a biometric acquisition module 11, a memory module 12 and a processing module 13. The electronic device 1, as shown in FIG. 1, relates to a mobile phone or a personal computer (PC), but is not limited thereto. It includes all kinds of electronic devices capable of preventing any undue mismatch during the authentication of biometric information.

The biometric acquisition module 11 is configured to obtain biometric information of a body part in the acquisition area.

For example, the biometric acquisition module 11, composed of a fingerprint acquisition module, is used for scanning fingerprints in the acquisition area to generate fingerprint information regarding the feature points (start point, end point, joint point and bifurcation) of fingerprint. Moreover, the biometric acquisition module 11 may also generate human face information with respect to face feature points by photographing human faces on the spot with photography via a camera.

In addition, in an embodiment of the embodiments, the biometric acquisition module 11 is used for acquiring other biometric information according to the biometric characteristics to be authenticated. For example, the biometric acquisition module 11 can obtain biometric information with respect to retina characteristics.

The memory module 12 is configured to store an authentication template for authentication of the biometric information.

For example, the memory module is used for acquiring the biometric information of a legitimate user in advance, generating the authentication template according to the pre-acquired biometric information, and then storing the biometric information in the memory module. Moreover, the electronic device 1 can also receive the authentication template generated in an external device, and store it in the memory module 12.

Specifically, when the fingerprint information is authenticated, a fingerprint authentication template of the legitimate user is generated based on the fingerprint feature points of the user by scanning the fingerprints (by scanning the finger of the user) in advance. Furthermore, when human face information is authenticated, a face authentication template of the user is generated based on the face feature points of the user by scanning the face of the user in advance.

In addition, in an embodiment of the embodiments, biometric information from body parts (such as a finger, human face and retina) of legitimate users can be stored in one or several authentication templates. When several authentication templates are stored, one or more authentication templates can be selected for authentication.

Preferably, in an embodiment of the embodiments, the environment value ranges with respect to humidity, illuminance and temperature can be set to associate with the authentication template when storing the authentication template. For example, the range of humidity (or other information such as temperature) can be set to associate with each fingerprint authentication template when storing the fingerprint authentication template. For another example, the environment value range of illuminance can be set to associate with each face authentication template when storing the face authentication template.

The environment value range with respect to each authentication template, for example, can be set based on the environment information when this authentication template is generated in advance. For example, the environment value range with respect to the fingerprint authentication template. For example, environment information can be set based on the humidity of the acquisition area while the fingerprints of a legitimate user are scanned. Specifically, in the case that the humidity of the acquisition area is 10% (relative humidity) while the fingerprints of the legitimate user are scanned, the humidity of the fingerprint authentication template may range from 0% to 20%.

Also, the environment value range with respect to the face authentication template, for example, can be set based on the illuminance of the spot for photography when the face of the legitimate user is photographed. Specifically, in the case that the illuminance of the area is 100 Lux when the face of a legitimate user is photographed in advance, the illuminance environment value range of the face authentication template may be set from 50 to 150 lux.

In addition, in an embodiment of the embodiments, the memory module 12 can store the authentication template corresponding to biometric characteristics to be authenticated according to the biometric characteristic to be authenticated. For example, the memory module 12 can store the authentication template related to retina characteristics.

The processing module 13 is configured to obtain an environment value of environment information at the acquisition area of the biometric acquisition module 11, and to determine an authentication template corresponding based on the environment information, in order to verify a user identity.

Specifically, in an embodiment of the embodiments, a sensor may be configured to detect the environment information of an environment where the acquisition area of the biometric acquisition module 11 is located when the biometric acquisition module 11 is used for acquiring the biometric information, and to transmit the detected environment information to the processing module. For example, while the biometric acquisition module 11 is used for acquiring the fingerprint information, a humidity sensor is configured to detect the humidity of the environment where the acquisition area of the biometric acquisition module 11 is located. As another example, while the biometric acquisition module 11 is used for acquiring the face information, an illuminance sensor is configured to detect the illuminance of the shooting environment where the shooting area of the biometric acquisition module 11 is located.

In addition, in an embodiment of the embodiments, the processing module 13 can be configured to obtain the said environment information instead of a sensor.

For example, the processing module 13 is used for analyzing the acquisition quality of the biometric information of the body part obtained in the acquisition area of the biometric acquisition module 11, and determining the environment information at the acquisition area of the biometric acquisition module on the basis of the acquisition quality.

Specifically, the biometric acquisition module 11, for example, may be used for scanning fingerprints in the acquisition area to generate fingerprint information of feature points with respect to the fingerprint. At this time, the processing module 13 is used for analyzing the acquisition quality of the fingerprint information generated by the biometric acquisition module, and on the basis of the acquisition quality, determining the humidity of the environment where the acquisition area of the biometric acquisition module 11 is located.

For example, the characteristics of fingerprint information for various humidity ranges may be determined by taking various fingerprint information, under the circumstances of high humidity in the environment at the acquisition area, medium humidity in the environment at the acquisition area, and low humidity in the environment at the acquisition area respectively. Thus, it can be determined that the characteristics of the acquired fingerprint information are more likely to match which humidity condition, upon analysis of the characteristics of the fingerprint information generated by the biometric acquisition module. For example, when the characteristics of the acquired fingerprint information are more likely to match the fingerprint information under the said high humidity condition, then high humidity of the environment at the acquisition area of the biometric acquisition module 11 can be determined. As another example, when the characteristics of the acquired fingerprint information are more likely to match that of the fingerprint information under the said low humidity, then low humidity of the environment at the acquisition area of the biometric acquisition module 11 can be determined.

Specifically, when the biometric acquisition module 11 generates human face information with respect to face feature points by photographing a human face on the spot with photography via a camera, the processing module 13 can determine the illuminance of the environment where the acquisition area of the biometric acquisition module 11 is located through the average brightness of the photographed face image. For example, low illuminance of the environment where the acquisition area of the biometric acquisition module 11 is located can be determined when the average brightness of the photographed face image is low; and high illuminance of the environment where the acquisition area of the biometric acquisition module 11 is located can be determined when the average brightness of the photographed face image is high.

Additionally, in an embodiment of the embodiments, the processing module 13 can also be used for determining the environment information during the acquisition of biometric information by the biometric acquisition module 11, based on the location information. Specifically, the processing module 13 is used for acquiring the location information of the environment where the acquisition area of the biometric acquisition module 11 is located, and on the basis of the location information, determining the environment information at the acquisition area of the biometric acquisition module 11.

For example, low humidity of the environment where the acquisition area of the biometric acquisition module 11 is located can be determined based on the location information, if the location information obtained by the processing module 13 via a GPS module is located in Sanya. As another example, low humidity of the environment where the acquisition area of the biometric acquisition module 11 is located can be determined based on the location information, if the location information obtained by the processing module 13 is located in Lanzhou.

Additionally, in an embodiment of the embodiments, the processing module 13 can also be used for determining the environment information at the acquisition area of the biometric acquisition module 11 during the acquisition of biometric information by the biometric acquisition module 11 by virtue of weather information and other means, as long as the determined environment information can be used for determining proper authentication templates.

The processing module 13 is used for determining an authentication template corresponding to the environment information based on the obtained environment information such as humidity, illuminance through the above processing.

As stated, information range can be set to associate with the authentication template when storing the authentication template in the memory module 12. For example, the range of humidity can be set to associate with each fingerprint authentication template when storing the fingerprint authentication template. For another example, the range of illuminance can be set to associate with each face authentication template when storing the face authentication template.

At this time, the processing module 13, for example, is used for identifying which range of the acquired environment information falls within the first range, and then determining the authentication template corresponding to the first range.

For example, suppose that the memory module 12 stores a fingerprint authentication template A and a fingerprint authentication template B, the humidity with respect to the fingerprint authentication template A ranges from 0% to 20%, and the humidity with respect to the fingerprint authentication template B ranges from 30% to 60%. In the above cases, the fingerprint authentication template B is selected when the humidity of the environment obtained by the processing module 13 is 40%. Moreover, the fingerprint authentication template A is selected when the humidity of the environment obtained by the processing module 13 is low.

Additionally, the processing module can select the authentication template related to the closest range when the acquired environment information fails to fall within any range. For example, the processing module 13 can select the fingerprint authentication template B when the humidity of the environment obtained by the processing module 13 is 25%.

Furthermore, when the range of illuminance is set to associate with each face authentication template, the processing module 13 can determine the authentication template corresponding to the illuminance of the acquired environment by the above method. Herein, no more examples will be provided.

In addition, taking the environment information for example, humidity and illuminance are illustrated in the above description; however, the present embodiments are not limited by this. Other environment information such as temperature may be used as long as it can be used for selecting proper authentication templates.

Returning to FIG. 1, the processing module 13 is used for authenticating the biometric information obtained by the biometric acquisition module 11 based on the determined authentication template corresponding to the environment information.

In an embodiment of the embodiments, the method of applying authentication template to authenticate the biometric information can be in any form. For example, the processing module 13 is used for determining whether the consistency ratio of the feature points in the biometric information to the authentication plate exceeds a preset percentage. Authentication succeeds when the ratio exceeds the preset percentage; otherwise, authentication fails. Specifically, the processing module 13 is used for determining whether the consistency ratio of the feature points (start point, end point, joint point and bifurcation) in the fingerprint information to the fingerprint authentication template exceeds the preset percentage. Authentication succeeds when the ratio exceeds the preset percentage; otherwise, authentication fails.

Legitimate users have to conduct acquisition and authentication once again when the authentication fails. Moreover, if a proper authentication template is used during authentication, the processing module 13 can determine if the biometric information authentication of a legitimate user is successful by performing a light calculation (meaning, relatively short processing time). Whereas, if improper authentication template is applied during authentication, biometric information authentication failure can be determined for a legitimate user according to the authentication result of the processing module 13; or successful biometric information authentication can only be determined for the legitimate user after a series of extensive calculation is performed (meaning, longer processing time).

According to the electronic device 1 as provided in an embodiment of the embodiments, a proper authentication template can be selected by obtaining the environment information at the acquisition area of the biometric acquisition module 11 via the processing module 13, thus an authentication template corresponding to the environment information based on the environment information can be determined. For this reason, the effectiveness for authentication of the acquired biometric information with the authentication module can be improved (thus reducing the frequency and duration of the authentication process) when the biometric information is authenticated by virtue of the selected authentication template, thus improving the user experience of legitimate users.

In addition, in an embodiment of the embodiments, preferably, the authentication template stored in the memory module 12 is updated so proper selection can be made in the subsequent authentications, and improve the effectiveness of the authentication.

Specifically, the processing module 13 is used for determining whether the environment information satisfies the first preset condition, and updating the authentication template stored in the memory module when the environment information satisfies the first preset condition.

For example, the memory module 12 can store an authentication template, and set information range with respect to the authentication template. If the environment information during the acquisition of biometric information by the biometric acquisition module 11 exceeds the information range, the authentication information will be modified based on the biometric information acquired by the biometric acquisition module 11. For example, the memory module 12 stores an authentication template, and the humidity with respect to the fingerprint authentication template is set within the range of 20-40%. If the humidity is 10% when the fingerprint information X is acquired, the fingerprint information X is used for modifying the fingerprint authentication template upon successful authentication for the fingerprint information X. In this case, the fingerprint authentication template is applicable to 20-40%. By modifying the fingerprint authentication template with fingerprint information X, the modified authentication template will be more suitable for the fingerprint information acquired in the environment with lower humidity.

For example, the memory module 12 can store several authentication templates, and the information range with respect to these authentication templates is set individually. If the environment information during the acquisition of biometric information by the biometric acquisition module 11 doesn't fall within any information range, a new authentication template with respect to the corresponding range of the acquired environment information will be generated based on the biometric information acquired by the biometric acquisition module 11, or the authentication template with the information range closest to the acquired environment information will be modified. For example, the memory module 12 stores the fingerprint authentication template A and the fingerprint authentication template B, the humidity with respect to the fingerprint authentication template A ranges from 0% to 20%, and the humidity with respect to the fingerprint authentication template B ranges from 30% to 60%. In the case that the humidity is high when acquiring fingerprint information Y, the fingerprint information Y can be used for modifying the fingerprint authentication template B upon successful authentication for the fingerprint information Y with the fingerprint authentication template B (closest information range). In the above cases, a new fingerprint authentication template C with respect to the range of high humidity can also be generated based on the fingerprint information Y. Thus, in the case of high humidity of the environment at the acquisition area, more appropriate fingerprint authentication template C can be applied for the fingerprint information acquired in the environment with high humidity. Alternatively, the modified fingerprint authentication template B can be applied to the fingerprint information acquired in the environment with high humidity.

Moreover, the information range with respect to the modified authentication template can be correspondingly modified in the case of modifying authentication template based on the biometric information. In the above cases, the range of humidity with respect to the fingerprint authentication template may be modified from 20-40% to 5-40%.

Moreover, in the above description, taking the fingerprint authentication template for example, updating the authentication template has been specified. However, the present embodiments are not limited to this, and can also be used to update the authentication template with respect to biometric information such as a face authentication template.

Furthermore, preferably, in an embodiment of the embodiments, the processing module 13 is used for calculating the matching degree of the authentication template corresponding to the environment information when the environment information does not satisfy the first preset condition, and when the matching degree satisfies the second preset condition, the authentication template is updated.

For example, the processing module 13 is used for calculating the time needed for obtaining the biometric information from the biometric acquisition module 11 and the authentication process by the authentication template; or the processing module 13 is used for calculating the number of times for acquiring and authenticating the biometric information until the biometric information obtained by the biometric acquisition module 11 is authenticated successfully. In the case that the processing time exceeds a preset time, or the number of processing iterations exceeds a preset number of iterations, the matching degree of the authentication template corresponding to the environment information will be deemed satisfactory for the second preset condition.

As stated above, the legitimate user has to conduct acquisition and authentication once again when the authentication fails. Moreover, if a proper authentication template is used during authentication, the processing module 13 can determine the biometric information authentication of the legitimate user to be successful by performing light calculation (meaning, relatively short processing time). Conversely, if an improper authentication template is used during authentication, as a result, the authentication would fail for the legitimate user according to the authentication result of the processing module 13; or successful biometric information authentication can only be determined for the legitimate user after performing calculation (meaning, longer processing time).

With respect to processing module 13, under the condition that the environment information acquired during the acquisition of biometric information by the biometric acquisition module 11 satisfies the first preset condition, and the authentication template does not match the biometric information, it indicates that the authentication template does not match the information range relevant to the authentication template. In this case, the processing module 13 will update the authentication template.

For example, in the case that the humidity of the environment is low during the acquisition of biometric information by the biometric acquisition module 11, and the memory module 12 stores the fingerprint authentication template corresponding to the range of low humidity, the authentication template corresponding to the range of low humidity can be selected for authenticating the fingerprint information. As a result, the processing module considers that the environment information does not satisfy the first preset condition (the environment information is within the scope with respect to the authentication template). However, if the authentication duration is longer than 10 s, or until the fingerprint information authenticates successfully and the number of times for authenticating the fingerprint information is more than twice, the authentication template can be determined as mismatched for the range of low humidity. As a result, the processing module 13 will modify the authentication template according to the fingerprint information. Thus, the modified fingerprint authentication template can better match the range with respect to the fingerprint authentication template, in order to select proper authentication template for subsequent authentications, and improve the effectiveness of authentication.

Figure 2:
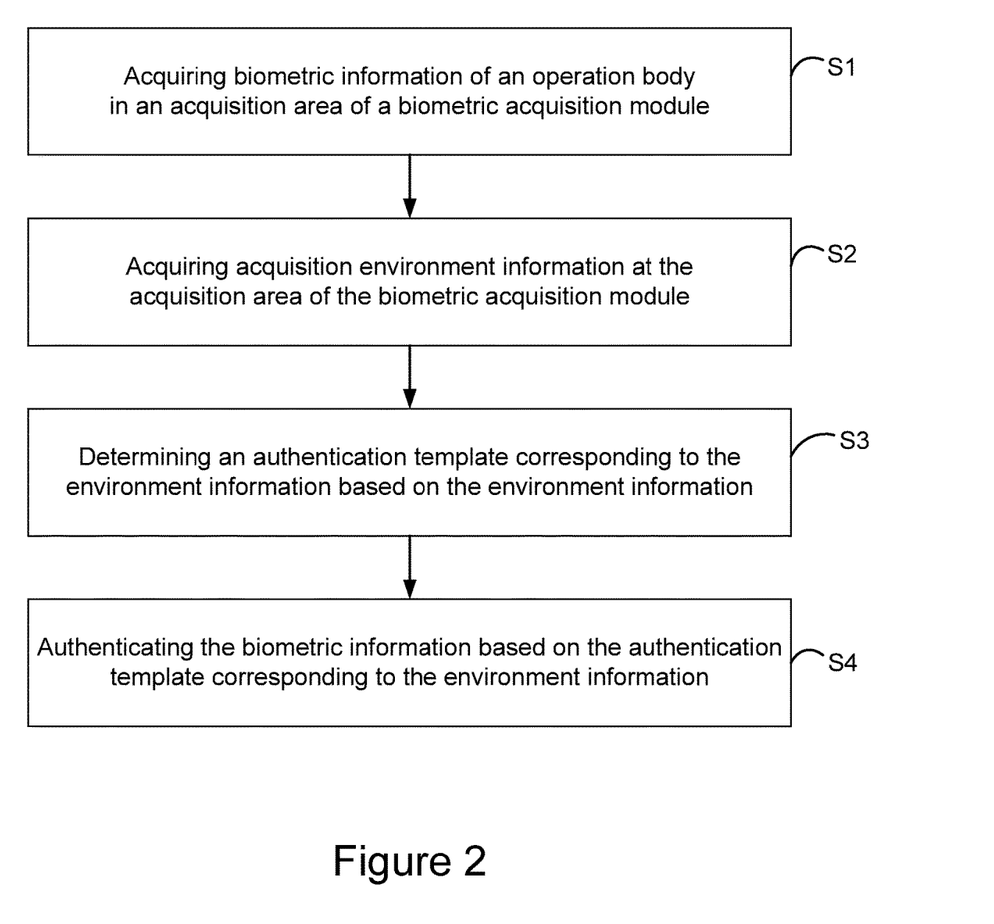
FIG. 2 illustrates a flow chart showing a biometric authentication method as provided in the embodiment.

Referring to FIG. 2, a biometric authentication method as provided in an embodiment of the embodiments is presented below. FIG. 2 is a flow chart illustrating a biometric authentication method as provided in an embodiment of the embodiments.

The biometric authentication method as shown in FIG. 2 can be applied to the electronic device as shown in FIG. 1. As shown in FIG. 1, the electronic device 1 comprises a biometric acquisition module 11, a memory module 12 and a processing module 13. The electronic device 1, as shown in FIG. 1, relates to mobile phone or personal computer (PC), but is not limited thereto. It includes all kinds of electronic devices capable of preventing misuses through the authentication of biometric information.

In step S1, biometric information of a body part is obtained in the acquisition area of the biometric acquisition module.

Specifically, in the case that the biometric information is applied to the electronic device 1 as shown in FIG. 1, the biometric acquisition module 11 is used for acquiring fingerprints in the acquisition area to generate fingerprint information with respect to feature points (start point, end point, joint point and bifurcation). Moreover, the biometric acquisition module 11 may also generate human face information with respect to face feature points by photographing a human face on the spot with photography via a camera.

In addition, in an embodiment of the embodiments, other biometric information can also be acquired according to biometric characteristics to be authenticated. For example, the biometric acquisition module 11 can obtain biometric information with respect to retina characteristics.

In step S2, the environment information at the acquisition area of the biometric acquisition module is acquired.

Specifically, a sensor can be configured to detect the environment information at the acquisition area of the biometric acquisition module during the acquisition of biometric information by the biometric acquisition module. For example, in the case that the biometric acquisition module acquires the fingerprint information, a humidity sensor can be configured to detect the humidity of the environment where the acquisition area of the biometric acquisition module is located. As another example, in the case that the biometric acquisition module acquires human face information, an illuminance sensor can be configured to detect the illuminance of the shooting environment where the spot for photography of the biometric acquisition module is located.

In addition, in an embodiment of the embodiments, it is possible to obtain the above environment information without configuration of sensors.

Specifically, step S2 comprises: analyzing the acquisition quality of the biometric information of the body part obtained in the acquisition area of the biometric acquisition module; and on the basis of the acquisition quality, determining the environment information at the acquisition area of the biometric acquisition module.

For example, in the case that the biometric information is applied to the electronic device 1 as shown in FIG. 1, the biometric acquisition module 11 is used for acquiring fingerprints in the acquisition area to generate fingerprint information with respect to feature points. At this time, the processing module 13 is used for analyzing the acquisition quality of the fingerprint information generated by the biometric acquisition module, and on the basis of the acquisition quality, determining the humidity of the environment where the acquisition area of the biometric acquisition module 11 is located. For example, the characteristics of fingerprint information under each humidity condition can be concluded by acquiring the fingerprint information in advance, in the case of high humidity in the environment at the acquisition area, in the case of medium humidity in the environment at the acquisition area, and in the case of low humidity in the environment at the acquisition area respectively. Thus, it can be determined that the characteristics of the acquired fingerprint information are more likely to match which humidity condition, upon analysis of the characteristics of the fingerprint information generated by the biometric acquisition module. For example, when the characteristics of the acquired fingerprint information are more likely to match that of the fingerprint information under the above high humidity condition, then high humidity of the environment at the acquisition area of the biometric acquisition module 11 can be determined. As another example, when the characteristics of the acquired fingerprint information are more likely to match that of the fingerprint information under the above low humidity condition, then low humidity of the environment at the acquisition area of the biometric acquisition module 11 can be determined.

Also, when the biometric acquisition module 11 generates human face information with respect to face feature points by photographing a human face on the spot with photography via a camera, the processing module 13 can determine the illuminance of the environment where the acquisition area of the biometric acquisition module 11 is located through the average brightness of the photographed face image. For example, low illuminance of the environment where the acquisition area of the biometric acquisition module 11 is located can be determined when the average brightness of the photographed face image is low; and high illuminance of the environment where the acquisition area of the biometric acquisition module 11 is located can be determined when the average brightness of the photographed face image is high.

Optionally, step S2 comprises: acquiring the location position of the environment where the acquisition area of the biometric acquisition module is located; and based on the location information, determining the environment information at the acquisition area of the biometric acquisition module.

For example, in the electronic device 1 as shown in FIG. 1, high humidity of the environment where the acquisition area of the biometric acquisition module 11 is located can be determined based on the location information, such location information obtained by the processing module 13 via a GPS module that the electronic device is located in Sanya. As another example, low humidity of the environment where the acquisition area of the biometric acquisition module 11 is located can be determined based on the location information, such as location information obtained by the processing module 13 that the electronic device is located in Lanzhou.

Additionally, in an embodiment of the embodiments, the environment information at the acquisition area of the biometric acquisition module 11 during the acquisition of biometric information by the biometric acquisition module can be determined by virtue of weather information and other means, as long as the determined environment information can be used for determining proper authentication templates.

Returning to FIG. 2, in step S3, the authentication template corresponding to the environment information is determined based on the environment information acquired in step S2.

For example, the environment value range can be set to associate with the authentication template in the electronic device 1 as shown in FIG. 1 when the memory module 12 stores the authentication template. For example, the environment value range of humidity can be set to associate with each fingerprint authentication template when storing the fingerprint authentication template.

For example, the processing module 13, may be used for identifying the environment value range of the acquired environment information, and then used to determine the authentication template corresponding to the first environment value range when the obtained environment information is within the first range. For example, suppose that the memory module 12 stores a fingerprint authentication template A and a fingerprint authentication template B, the humidity with respect to the fingerprint authentication template A ranges from 0% to 20%, and the humidity with respect to the fingerprint authentication template B ranges from 30% to 60%. In the above case, the fingerprint authentication template B is selected when the humidity of the environment obtained in step S2 is 40%. Moreover, the fingerprint authentication template A is selected when the environment information obtained in step S2 indicates low humidity. Additionally, the authentication template with respect to the closest range can be selected when the acquired environment information fails to fall within any environment value range. For example, the fingerprint authentication template B is selected when the humidity of the environment obtained in step S2 is 25%.

In addition, in the above description, taking the environment information for example, humidity is illustrated in the above description; however, the present embodiments are not limited by this. Other environment information such as temperature can also be used for selecting proper authentication templates.

In step S4, the biometric information based on the authentication template corresponding to the environment information is applied for authentication.

Specifically, in an embodiment of the embodiments, the method of applying the authentication template determined in step S3 to authenticate the biometric information acquired in step S1 can be in any form.

For example, in the electronic device 1 as shown in FIG. 1, the processing module 13 is used for determining whether a consistency ratio of the feature points in the biometric information to the authentication template exceeds the preset percentage. Authentication succeeds when the ratio exceeds the preset percentage; otherwise, authentication fails. Specifically, the processing module 13 is used for determining whether a consistency ratio of the feature points (start point, end point, joint point and bifurcation) in the fingerprint information to the fingerprint authentication template exceeds the preset percentage. Authentication succeeds when the ratio exceeds the preset percentage; otherwise, authentication fails.

The legitimate user has to conduct acquisition and authentication once again when the authentication fails. Moreover, if a proper authentication template is used during authentication, the processing module 13 can determine the biometric information authentication of the legitimate user to be successful by performing light calculation (meaning, relatively short processing time). Whereas, if an improper authentication template is used during authentication, biometric information authentication failure can be determined for the legitimate user according to the authentication result of the processing module 13; or successful biometric information authentication can only be determined for the legitimate user after performing a series of extensive calculation (meaning, longer processing time).

According to the biometric authentication method as provided in an embodiment of the embodiments, a proper authentication template can be obtained by acquiring the environment information at the acquisition area of the biometric acquisition module, and determining the authentication template with an environment value range corresponding to the environment information. For this reason, the effectiveness of authentication for acquiring biometric information with the authentication module can be improved (thus reducing the frequency and duration of the authentication process) when the biometric information is authenticated by virtue of the selected authentication template, thus improving the experience of legitimate users.

In addition, according to the biometric authentication method as provided in an embodiment of the embodiments, the authentication template is preferably updated to allow for the proper authentication template selection for the subsequent authentications, and improve the effectiveness of the authentication.

Specifically, the biometric authentication method as provided in an embodiment of the embodiments comprises: determining whether the environment information satisfies a first preset condition; and updating the authentication template when the environment information satisfies the first preset condition.

For example, in the electronic device 1 as shown in FIG. 1, the processing module 13 is used for determining whether the environment information acquired in step S2 satisfies the first preset condition, and updating the authentication template when the environment information satisfies the first preset condition.

For example, the memory module 12 can store an authentication template, and set an information range with respect to the authentication template. If the environment information during the acquisition of biometric information by the biometric acquisition module 11 exceeds the information range, the authentication information will be modified based on the biometric information acquired by the biometric acquisition module 11. For example, the memory module 12 stores an authentication template, and set the humidity with respect to the fingerprint authentication template within the range of 20-40%. In the case that the humidity is 10% when acquiring the fingerprint information X, the fingerprint information X is used for modifying the fingerprint authentication template upon successful authentication for the fingerprint information X. In this case, the fingerprint authentication template was applicable to 20-40% and by modifying the fingerprint authentication template with fingerprint information X, the modified authentication template will be more suitable for the fingerprint information acquired in the environment with lower humidity.

For example, the memory module 12 can store several authentication templates, and the environment value range with respect to each authentication template is set respectively. If the environment value from the acquisition of biometric information by the biometric acquisition module 11 doesn't fall in any information range, a new authentication template with respect to the corresponding range of the acquired environment information will be generated based on the biometric information acquired by the biometric acquisition module 11, or the authentication template with respect to the information range closest to the acquired environment information will be modified. For example, the memory module 12 stores the fingerprint authentication template A and the fingerprint authentication template B, the humidity with respect to the fingerprint authentication template A ranges from 0% to 20%, and the humidity with respect to the fingerprint authentication template B ranges from 30% to 60%. In the case that the humidity is high when acquiring fingerprint information Y, the fingerprint information Y can be used for modifying the fingerprint authentication template B upon successful authentication for the fingerprint information Y with the fingerprint authentication template B (closest information range). In the above cases, a new fingerprint authentication template C with respect to the range of high humidity can also be generated based on the fingerprint information Y. Thus, in the case of high humidity of the environment at the acquisition area, a more appropriate fingerprint authentication template C can be applied for the fingerprint information acquired in the environment with high humidity. Alternatively, the modified fingerprint authentication template B can be applicable to the fingerprint information acquired in the environment with high humidity.

Moreover, the environment value range with respect to the modified authentication template can be correspondingly modified in the case of modifying authentication template based on the biometric information. In the above cases, the range of humidity with respect to the fingerprint authentication template may be modified from 20-40% to 5-40%.

In addition, the biometric authentication method as provided in an embodiment of the embodiments preferably comprises: calculating the matching degree of the authentication template corresponding to the environment information when the environment information does not satisfy the first preset condition, and updating the authentication template when the matching degree satisfies the second preset condition.

For example, in the electronic device 1 as shown in FIG. 1, the processing module 13 is used for calculating the matching degree of the authentication template corresponding to the environment information when the environment information acquired in step S2 does not satisfy the first preset condition, and updating the authentication template when the matching degree satisfies the second preset condition.

For example, the processing module 13 is used for calculating the time needed for authenticating the biometric information obtained by the biometric acquisition module 11 and the authentication template; or the processing module 13 is used for calculating the number of times for acquiring and authenticating the biometric information until the biometric information obtained by the biometric acquisition module 11 is authenticated successfully. In the case that the processing time exceeds the preset time, or the number of processing iterations exceeds the preset number of iterations, the matching degree of the authentication template corresponding to the environment information will be determined as satisfactory to the second preset condition.

As stated above, the legitimate user has to conduct acquisition and authentication once again when the authentication fails. If an improper authentication template is used during authentication, a biometric information authentication failure can be determined for the legitimate user according to the authentication result of the processing module 13; or a successful biometric information authentication can only be determined for the legitimate user after a series of extensive calculations (meaning, longer processing time).

With respect to processing module 13, under the condition that the environment information acquired during the acquisition of biometric information by the biometric acquisition module 11 satisfies the first preset condition, and the environment value range does not match the environment value of the biometric information, it indicates that the authentication template does not match the environment value range relevant to the authentication template. In this case, the processing module 13 will update the authentication template.

For example, in the case that the humidity of the environment is low during the acquisition of biometric information by the biometric acquisition module 11, and the memory module 12 stores the fingerprint authentication template corresponding to the environment value range of low humidity, the authentication template corresponding to the environment value range of low humidity can be selected for authenticating the fingerprint information. As a result, the processing module considers that the environment information does not satisfy the first preset condition (the environment information is within the scope of the environment value range with respect to the authentication template). However, if the authentication duration is longer than 10 s, or until the fingerprint information authenticates successfully, or the number of iterations for authenticating the fingerprint information is more than twice the number of iterations, the authentication template can be determined as mismatched with the range of low humidity. As a result, the processing module 13 will modify the authentication template according to the fingerprint information. Thus, the modified fingerprint authentication template can better match the environment value range with respect to the fingerprint authentication template to allow for proper authentication template selection for the subsequent authentications, and improve the effectiveness of authentication.

With reference to various modules and steps described in an embodiment of the embodiments, a person skilled in the art should understand that it can be realized by electronic hardware, computer software or the combination of the two. Software can be placed in computer memory media in any form. To clearly illustrate the interchangeability of hardware and software, general descriptions on compositions and steps of each example by function have been made above. Whether these functions are implemented by software or hardware depends on the specific application of the technical solution and design constraints. Besides, a person skilled in the art can also realize the described function in various ways in terms of specific application; however, such realization shall not be considered as deviating from the scope of the embodiments.

Various embodiments of the embodiments have been presented above. However, a person skilled in the art should understand that various alterations, combinations or subcombinations can be made to the embodiments without departing from the principle and spirit of the present embodiments, and such alterations shall fall within the scope of the present embodiments.

What is claimed is:

1. An electronic device comprising;
   a biometric acquisition module that operatively acquires fingerprint user biometric information;
   a memory module that operatively stores the user biometric information and one or more authentication templates for fingerprints for a plurality of humidity ranges;
   a processing module that:
   operatively acquires environment information comprising an acquired environment value of a humidity for the biometric acquisition module that corresponds to the user biometric information;
   authenticates the user biometric information to verify a user identity using a corresponding authentication template of the one or more authentication templates that comprises a given humidity range that comprises the acquired environment value, wherein fingerprint user biometric information is authenticated in respond to a consistency ratio of feature points exceeding a preset percentage;
   determines that the corresponding authentication template is mismatched in response to an authentication duration exceeding a specified time; and
   in response to determining the corresponding authentication template is mismatched generates a new authentication template based on the user biometric information for a new humidity range based on the acquired environment value.

2. The electronic device of claim 1, wherein the processing module is further operative to generate the one or more authentication templates, wherein each authentication template comprises fingerprint authentication biometric information captured by the biometric acquisition module and a corresponding humidity range that comprises a humidity of the biometric acquisition module concurrent with the capture of the fingerprint authentication biometric information for the authentication template.

3. The electronic device of claim 1, wherein the processing module is further operative to:
   determine that the humidity ranges of the one or more authentication templates do not comprise the acquired environment value;
   authenticate the user biometric information with an alternate authentication template with a humidity range closest to the acquired environment value; and
   generate a new authentication template with a new environment value range comprising the acquired environment value.

4. The electronic device of claim 3, wherein the fingerprint user biometric information is authenticated with the alternate authentication template in response to a number of authentication processing iterations exceeding a preset number of iterations.

5. The electronic device of claim 3, wherein the new authentication template comprises new authentication biometric information generated from the fingerprint user biometric information.

6. The electronic device of claim 3, wherein the new authentication template comprises new authentication biometric information generated by modifying the alternate authentication template.

7. The electronic device of claim 1, wherein acquiring the acquired environment value comprises:
   analyzing an acquisition quality of the fingerprint user biometric information; and
   determining the acquired environment value based on the acquisition quality.

8. The electronic device of claim 1, wherein acquiring the acquired environment value comprises:
   acquiring location information for the biometric acquisition module; and
   determining the acquired environment value based on the location information.

9. The electronic device of claim 1, wherein the processing module is further operative to:
   determine whether the environment information satisfies a first preset condition; and
   update the corresponding authentication template in response to the environment information satisfying the first preset condition.

10. The electronic device of claim 9, wherein if the environment information does not satisfy the first preset condition, the processing module is further operative to:
    calculate a matching degree of the corresponding authentication template; and
    update the corresponding authentication template in response to the matching degree satisfying a second preset condition.

11. A method comprising;
    acquiring, by use of a processor, fingerprint user biometric information with a biometric acquisition module;
    storing the user biometric information and one or more authentication templates for fingerprints for a plurality of humidity ranges;
    acquiring environment information comprising an acquired environment value of a humidity for the biometric acquisition module that corresponds to the user biometric information;
    authenticating the user biometric information to verify a user identity using a corresponding authentication template of one or more authentication templates that comprises a given humidity range that comprises the acquired environment value, wherein fingerprint user biometric information is authenticated in response to a consistency ratio of feature points exceeding a preset, percentage;
    determining that the corresponding authentication template is mismatched in response to an authentication duration exceeding a specified time; and
    in response to determining the corresponding authentication template is mismatched, generating a new authentication template based on the user biometric information for a new humidity range based on the acquired environment value.

12. The method of claim 11, the method further comprising generating the one or more authentication templates, wherein each authentication template comprises fingerprint authentication biometric information captured by the biometric acquisition module and a corresponding humidity range that comprises an environment value of the biometric acquisition module concurrent with the capture of the fingerprint authentication biometric information for the authentication template.

13. The method of claim 11, the method further comprising:
    determining that the humidity ranges of the one or more authentication templates do not comprise the acquired environment value;

authenticating the user biometric information with an alternate authentication template with a humidity range closest to the acquired environment value; and generating a new authentication template with a new environment value range comprising the acquired environment value.

14. The method of claim 13, wherein the fingerprint user biometric information is authenticated with the alternate authentication template in response to a number of authentication processing iterations exceeding a preset number of iterations.

15. The method of claim 13, wherein the new authentication template comprises new authentication biometric information generated from the fingerprint user biometric information.

16. The method of claim 13, wherein the new authentication template comprises new authentication biometric information generated by modifying the alternate authentication template.

17. The method of claim 11, wherein acquiring the acquired environment value comprises:

analyzing an acquisition quality of the fingerprint user biometric information; and determining the acquired environment value based on the acquisition quality.

18. The method of claim 11, wherein acquiring the acquired environment value comprises:

acquiring location information for the biometric acquisition module; and determining the acquired environment value based on the location information.

19. A system comprising;

a biometric acquisition module that acquires fingerprint user biometric information;

a sensor that acquires environment information comprising an acquired environment value of a humidity for the biometric acquisition module that corresponds to the acquired user biometric information;

a memory module that stores the user biometric information, the environment information, and one or more authentication templates;

a processing module that:

authenticates the user biometric information to verify a user identity using a corresponding authentication template of the one or more authentication templates that comprises a given humidity range that comprises the acquired environment value, wherein fingerprint user biometric information is authenticated in response to a consistency ratio of feature points exceeding a preset percentage;

determines that the corresponding authentication template is mismatched in response to an authentication duration exceeding a specified time; and in response to determining the corresponding authentication template is mismatched, generates a new authentication template based on the user biometric information for a new humidity range based on the acquired environment value.

20. The system of claim 19, wherein the processing module further generates the one or more authentication templates, wherein each fingerprint authentication template comprises authentication biometric information captured by the biometric acquisition module and a corresponding humidity range that comprises an humidity of the biometric acquisition module captured by the sensor concurrent with the capture of the fingerprint authentication biometric information for the authentication template.

* * * * *